(12) United States Patent
Nonomura et al.

(10) Patent No.: US 12,085,671 B2
(45) Date of Patent: Sep. 10, 2024

(54) DISTANCE DETECTOR, DISTANCE DETECTION METHOD, AND COMPUTER-READABLE MEDIUM

(71) Applicants: NIKON VISION CO., LTD., Tokyo (JP); NIKON CORPORATION, Tokyo (JP)

(72) Inventors: Takehito Nonomura, Nishitama-gun (JP); Takeshi Inoue, Yokohama (JP)

(73) Assignees: NIKON VISION CO., LTD., Tokyo (JP); NIKON CORPORATION, Tokyo (JP)

( * ) Notice: Subject to any disclaimer, the term of this patent is extended or adjusted under 35 U.S.C. 154(b) by 898 days.

(21) Appl. No.: 17/160,590

(22) Filed: Jan. 28, 2021

(65) Prior Publication Data

US 2021/0239800 A1 Aug. 5, 2021

(30) Foreign Application Priority Data

Jan. 31, 2020 (JP) ................................. 2020-015492

(51) Int. Cl.
*G01C 3/08* (2006.01)
*G01S 7/48* (2006.01)
*G01S 17/10* (2020.01)

(52) U.S. Cl.
CPC ............ *G01S 7/4808* (2013.01); *G01S 17/10* (2013.01)

(58) Field of Classification Search
CPC ............................... G01S 7/4808; G01S 17/10
See application file for complete search history.

(56) References Cited

U.S. PATENT DOCUMENTS

| | | | |
|---|---|---|---|
| 2017/0167867 A1* | 6/2017 | Ohmuro | G01C 3/06 |
| 2017/0234972 A1* | 8/2017 | Takizawa | G01S 17/10 |
| | | | 356/5.01 |
| 2017/0354858 A1 | 12/2017 | Lewis et al. | |
| 2020/0174115 A1* | 6/2020 | Prados | G01S 13/931 |

FOREIGN PATENT DOCUMENTS

| | | | | |
|---|---|---|---|---|
| JP | 2008-82883 A | | 4/2008 | |
| JP | 2006003098 A | * | 1/2016 | ............. G01S 17/87 |
| JP | 2016161438 A | * | 9/2016 | ............. G01S 7/487 |
| JP | 2018-091760 A | | 6/2018 | |
| JP | 2018-189494 A | | 11/2018 | |
| WO | 2019/225224 A1 | | 11/2019 | |

OTHER PUBLICATIONS

Mar. 22, 2023 Office Action issued in Japanese Patent Application No. 2020-015492.

* cited by examiner

*Primary Examiner* — Mark Hellner
(74) *Attorney, Agent, or Firm* — Oliff PLC

(57) ABSTRACT

A distance detector 10 includes a light projecting unit 100 which projects light toward a target body, a light receiving unit 200 which receives a reflected light from the target body, a time detection unit 310 which detects a light receiving time from the projecting of measuring light by the light projecting unit 100 to the receiving of the reflected light by the light receiving unit 200, a calculation unit 320 which calculates the distance to the target body based on a detection result of the light receiving time by the time detection unit 310, and an evaluation unit 340 which evaluates the reliability of a calculation result of the distance to the target body by the calculation unit 320 based on a deviation of the distance corresponding to the calculation result from a reference value regarding the distance to the target body.

18 Claims, 15 Drawing Sheets

DISTANCE DETECTOR, DISTANCE DETECTION METHOD, AND COMPUTER-READABLE MEDIUM The contents of the following Japanese patent application are incorporated herein by reference:
NO. 2020-015492 filed in JP on Jan. 31, 2020.

BACKGROUND

1. Technical Field

The present invention relates to a distance detector, a distance detection method, and a computer-readable medium.

2. Related Art

In a distance detector that measures the distance to a target body based on the light receiving time from projecting light toward the target body to receiving reflected light from the target body, the distance may be falsely detected by receiving the reflected light from another object different from the target body, etc. Patent Literature 1 discloses a distance detector that, when ranging a flag on a green at a golf course, determines a range before and after the green where the flag can be located based on map data, displays the result when the distance measurement result is included in the range, and measures the distance again when it is not included.
[Patent Literature 1] Specification of US Patent Application Publication No. 2017/0354858

GENERAL DISCLOSURE

In a first aspect of the invention, there is provided a distance detector that includes a light projecting unit configured to project light toward a target body, a light receiving unit configured to receive a reflected light from the target body, a detection unit configured to detect a light receiving time from the projecting of light by the light projecting unit to the receiving of the reflected light by the light receiving unit, a calculation unit configured to calculate the distance to the target body based on a detection result of the light receiving time by the detection unit, and an evaluation unit configured to evaluate a reliability of a calculation result of the distance to the target body by the calculation unit based on a deviation of a distance corresponding to the calculation result from a reference value regarding the distance to the target body.

In a second aspect of the invention, there is provided a distance detection method that includes projecting light toward a target body, receiving a reflected light from the target body, detecting a light receiving time from the projecting of light to the receiving of the reflected light, calculating the distance to the target body based on a detection result of the light receiving time, and evaluating a reliability of a calculation result of the distance to the target body based on a deviation of a distance corresponding to the calculation result from a reference value regarding the distance to the target body.

In a third aspect of the invention, there is provided a computer-readable medium having recorded thereon a program causing a computer to execute projecting light toward a target body, receiving a reflected light from the target body, detecting a light receiving time from the projecting of light to the receiving of the reflected light, calculating the distance to the target body based on a detection result of the light receiving time, and evaluating a reliability of a calculation result of the distance to the target body based on a deviation of a distance corresponding to the calculation result from a reference value regarding the distance to the target body.

The outline of the invention is not intended to list all of the features of the invention. The present invention may also be a sub-combination of the feature groups described above.

DESCRIPTION OF EXEMPLARY EMBODIMENTS

Hereinafter, the invention will be described through embodiments, but the following embodiments do not limit the invention according to the claims. In addition, not all of the combinations of features described in the embodiments are essential to the solving means of the invention.

Figure 1:
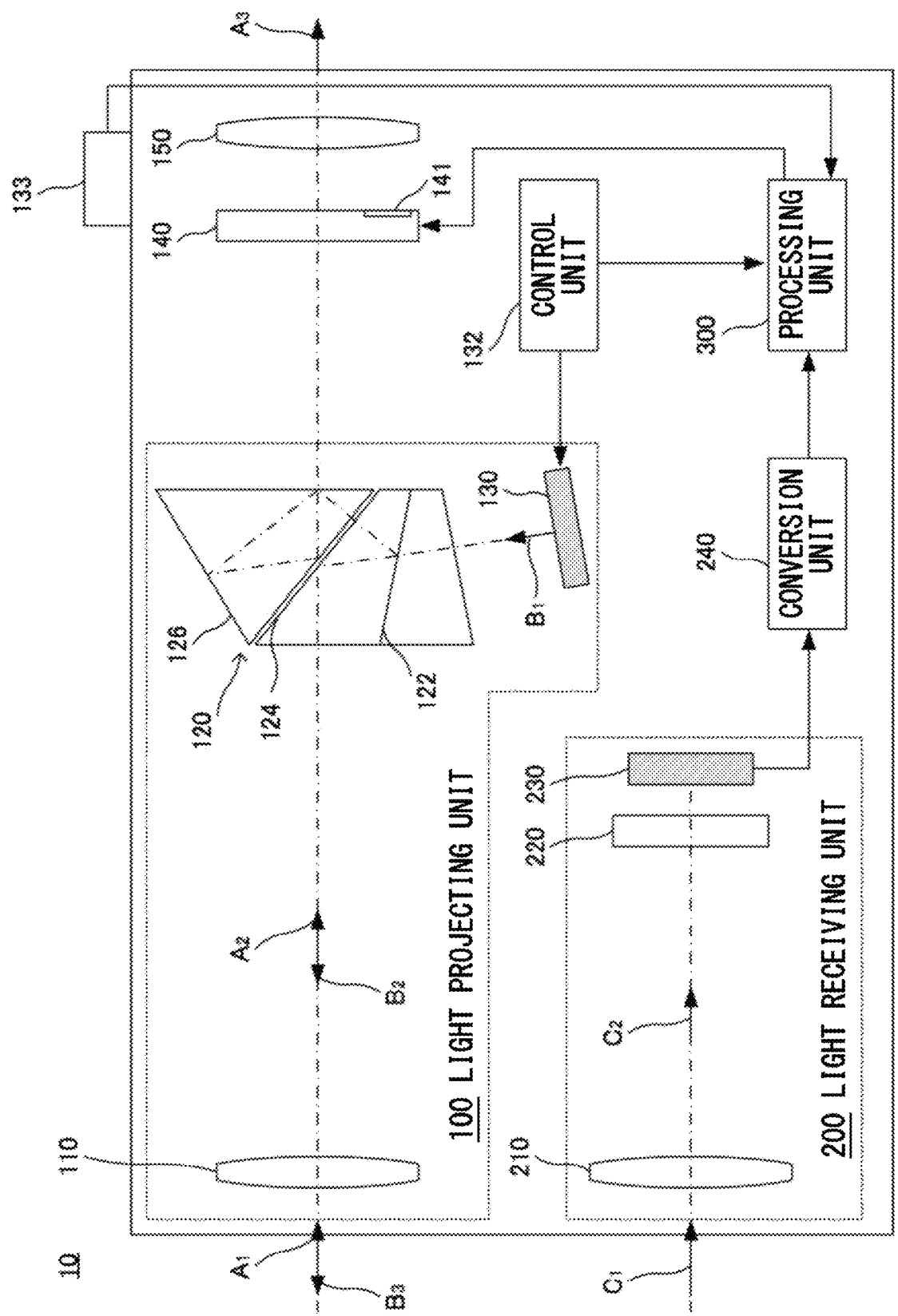
FIG. 1 is a diagram illustrating the configuration of a distance detector according to this embodiment.

FIG. 1 illustrates the configuration of a distance detector 10 according to this embodiment. Herein, the direction to which a light projecting unit 100 emits measuring light, that is, the direction of arrow of a light beam $B_3$ is a front side, and the opposite direction, that is, the direction of arrow of a light beam $A_3$ is a rear side. The distance detector 10 is a device for detecting a distance to a target body, and includes the light projecting unit 100, a reticle plate 140, an eyepiece lens 150, a control unit 132, a light receiving unit 200, a conversion unit 240, and a processing unit 300.

The light projecting unit 100 is a unit that projects measuring light toward the target body multiple times. The light projecting unit 100 includes a light emitting unit 130, an erect prism 120, and an objective lens 110.

The light emitting unit 130 emits a pulse-like measuring light (that is, a light beam $B_1$) toward the erect prism 120 at a certain period using a light source. As a light source, for example, a semiconductor laser which oscillates infrared rays can be used. The light emitting unit 130 emits a predetermined number (for example, 320 shots) of pulse-liked measuring light at a certain period (for example, a period of 500 to 700 μs) in one measurement.

The erect prism 120 is an optical element that sends the measuring light emitted from the light emitting unit 130 to the front side, and also sends the incident light beam to the eyepiece lens 150 on the rear side. Examples of the erect prism 120 can include a roof prism, a porro prism, and the like. The erect prism 120 includes a dichroic reflecting surface 122 which reflects light in the visible light band and transmits light in the infrared band, and total reflectance surfaces 124 and 126 which have a high reflectance with respect to both of the visible light band and the infrared band. The measuring light (the light beam $B_1$) transmits the dichroic reflecting surface 122 in the erect prism 120, is reflected on the total reflectance surface 124, and propagates in the distance detector 10 as a light beam $B_2$ to the front side. The incident light (a light beam $A_1$) is reflected by the dichroic reflecting surface 122, the total reflectance surface 124 and 126, and other reflecting surfaces in the erect prism 120. With this configuration, an inverted mirror image formed by the incident light is inverted to an erect normal image.

The objective lens 110 is an optical element which collimates the light beam $B_2$ emitted from the erect prism 120, and sends this beam as the light beam $B_3$ to the front side of the distance detector 10.

The reticle plate 140 is arranged at a focal position of the objective lens 110. The reticle plate 140 includes a collimation index (not illustrated) and a display unit 141. The collimation index has, for example, the shape of a cross line, a rectangular frame, a circular frame, or the like. The collimation index may be formed by printing, etching, or the like on a plate which is transparent with respect to the visible light, or may be displayed using a transparent liquid crystal. The display unit 141 shows the user the measurement result of distance to the target body by characters, images, or the like using a transparent liquid crystal or the like. Instead of directly provided in the reticle plate 140, the display unit 141 may be configured by a reflective liquid crystal and an optical system which guides a display image using the liquid crystal to the reticle plate 140. The display unit 141 may display the remaining battery level, an alert, a clock, and the like in addition to the distance measurement result. Further, the distance measurement result may be displayed in a display unit which belongs to a device different from the distance detector 10.

The eyepiece lens 150 is an optical element which concentrates the incident light to send it as the light beam $A_3$ to the rear side. In the distance detector 10, the front end thereof is set to face the back end of the erect prism 120.

The erect prism 120, the objective lens 110, the reticle plate 140, and the eyepiece lens 150 form a collimation unit with which the user collimates the distance detector 10 with respect to the target body. The collimation unit shares a part of the optical system with the light projecting unit 100, so that the apparent optical axes of the light projecting unit 100 and the collimation unit in the distance detector 10 match with each other.

, Among light reflected or scattered from the target body located on the front side of the distance detector 10, the light beam $A_1$, which propagates within the range of expected angles of the objective lens 110, enters in the collimation unit. The light beam $A_1$ is concentrated as a light beam $A_2$ via the objective lens 110, and emitted to the rear side of the distance detector 10 as the light beam $A_3$ through the erect prism 120, the reticle plate 140, and the eyepiece lens 150. With this configuration, the user can observe the erect normal image of the target body through the eyepiece lens 150.

The collimation index arranged in the reticle plate 140 is superimposed with the image of the target body which is observed through the eyepiece lens 150 by the user. With this configuration, the user superimposes the collimation index with the image to be observed through the eyepiece lens 150 to collimate the distance detector 10 to the target body. In this case, since the apparent optical axes of the light projecting unit 100 and the collimation unit match with each other as described above, the measuring light is emitted to the position indicated by the collimation index.

The control unit 132 is a unit which controls the intensity, the number of times of emission, the period, and the like of the measuring light emitted from the light projecting unit 100 (the light emitting unit 130). In addition, the control unit 132 can transmit an emission timing of the measuring light to the processing unit 300. With this configuration, the processing unit 300 can process the detection signal of the reflected light, which is output from the light receiving unit 200, according to the projection of each measuring light by the light projecting unit 100. The control unit 132 includes an operation button 133 provided in the housing of the distance detector 10. When the user presses the button, the distance measurement operation described below starts.

The light receiving unit 200 is a unit which receives the reflected light from the target body, and outputs a detection signal in the form of an electrical signal. The light receiving unit 200 includes a light receiving lens 210, the band pass filter 220, and a light receiving element 230.

The light receiving lens 210 is an optical element which concentrates the reflected light (that is, a light beam $C_1$) from the target body to sends it to the light receiving element 230 as a light beam $C_2$. Note that the light receiving lens 210 has an optical axis different from that of the objective lens 110 of the light projecting unit 100.

The band pass filter 220 is an optical element which transmits the light of a narrow band including the reflected light, and blocks or attenuates the light of other bands. The band pass filter 220 is arranged on the rear side of the light receiving lens 210.

The light receiving element 230 is an element which receives the reflected light, and outputs an electrical signal (also called a detection signal) corresponding to its intensity. As the light receiving element 230, for example, a photodiode, a phototransistor, or the like which has sensitivity to the band of the measuring light can be adopted. The light receiving element 230 is arranged on the rear side of the band pass filter 220. Note that the light receiving area of the light receiving element 230 is preferably smaller from the viewpoint of eliminating the influence of background light on the measuring light.

In the light receiving unit 200 of the above configuration, the light beam $C_1$ which has been reflected or scattered from the target body located on the front side of the distance detector 10 enters the light receiving lens 210. The light beam $C_1$ is concentrated by the light receiving lens 210, passes through the band pass filter 220 as the light beam $C_2$, and is received by the light receiving element 230. The light receiving element 230 outputs the detection signal corresponding to the intensity of the received light toward the conversion unit 240.

The conversion unit 240 includes, for example, an amplifier with which the detection signal output from the light receiving element 230 is amplified. Further, the conversion unit 240 may convert the detection signal into a differential signal. With this configuration, it is possible to reduce transmission noises. The conversion unit 240 supplies the amplified detection signal to the processing unit 300 as the detection signal.

The processing unit 300 is a unit which determines the light receiving time of the reflected light, that is, time T at which the light receiving unit 200 (the light receiving element 230) has received the reflected light of the measuring light reflected by the target body with respect to the projection of each measuring light by the light projecting unit 100 based on the detection signal output from the conversion unit 240, and further determines a distance to the target body from the detected time T. The processing unit 300 includes a comparator, a processor, and a communication device (all of which are not illustrated).

The comparator is an element which is connected to the conversion unit 240, compares the intensity of the detection signal output from the conversion unit with a preset threshold, and outputs a signal "1" (signal "0") in a case where the intensity is larger (smaller) than the threshold.

The processor executes a processing program to make the processing unit 300 serve to determine a distance to the target body based on the output signal of the comparator. Note that the processing program is stored in, for example, a ROM (not illustrated) and is started by the processor reading and deploying the program in the RAM.

The communication device is a device which wirelessly communicates with an external device.

Figure 2:
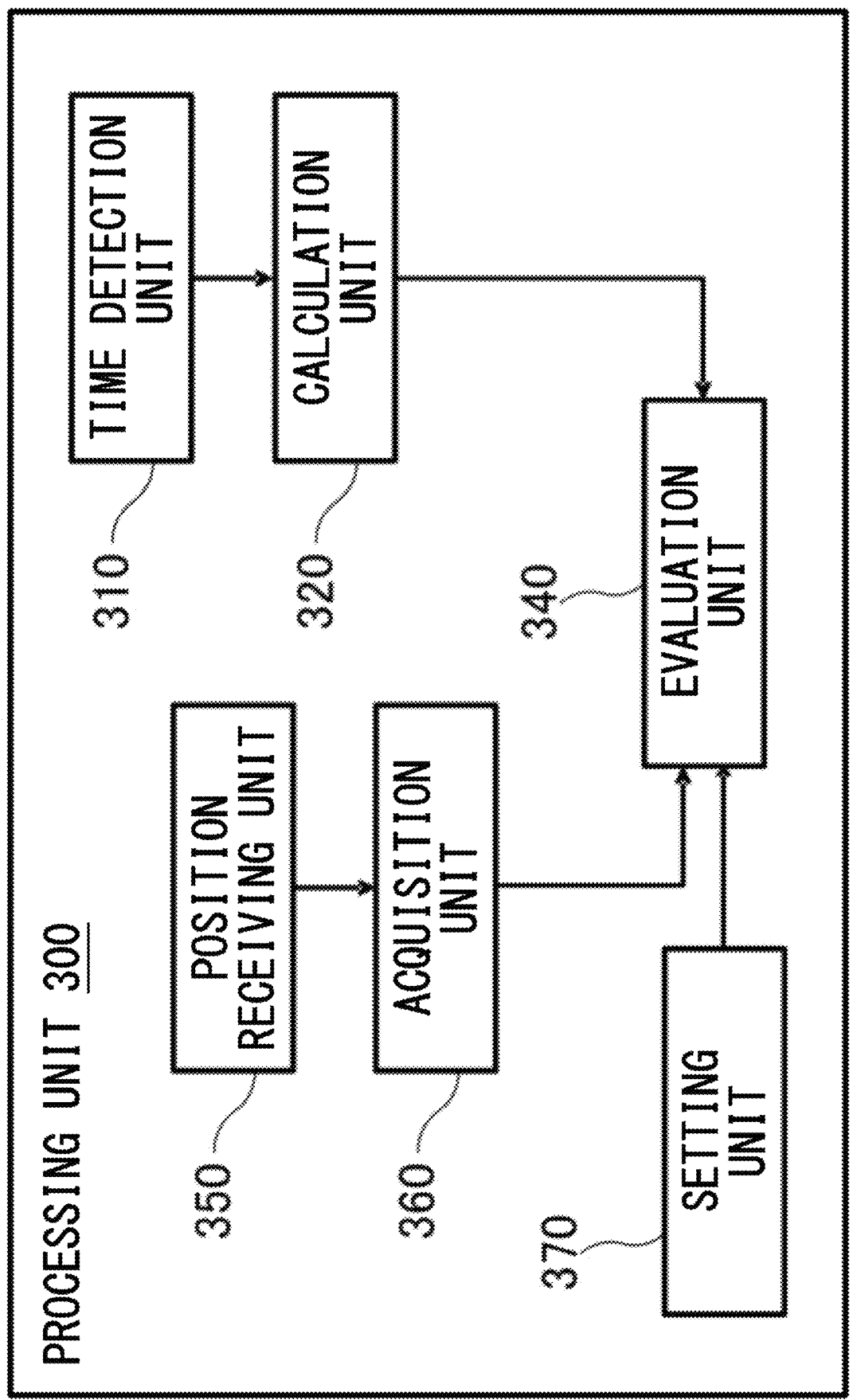
FIG. 2 is a diagram illustrating a functional configuration of a processing unit.

FIG. 2 illustrates a functional configuration of the processing unit 300. The processing unit 300 includes a time detection unit 310, a calculation unit 320, a position receiving unit 350, an acquisition unit 360, and a setting unit 370.

The time detection unit 310 detects the light receiving time from the projecting of the measuring light by the light projecting unit 100 to the receiving of the reflected light by the light receiving unit 200. In this embodiment, a histogram method is employed. In other words, the time detection unit 310 periodically counts the occurrence of an event in which the intensity of a light receiving signal obtained by receiving the reflected light by the light receiving unit 200 exceeds a threshold from each projecting of the measuring light by the light projecting unit 100 at every time of projecting the measuring light by the light projecting unit 100. The count is integrated for multiple times of projecting the measuring light, and the light receiving time is detected based on the integration result. The detection result is transmitted to the calculation unit 320. Note that the detection of the light receiving time is not limited to the histogram method described above. For example, the light receiving time is calculated for each projecting of the measuring light by the light projecting unit 100, and the light receiving time can be detected based on an average value of the light receiving time calculated for each projection.

The time detection unit 310 is triggered at the emission timing of each measuring light transmitted from the control unit 132 to sample each output signal of the comparator at a common sampling cycle (for example, at a sampling frequency of 200 MHz to 300 MHz, that is, every time 1/200000 to 1/300000 seconds elapse) with respect to the projection of the measuring light, and counts up in the case of signal "1" in each cycle (the counter value is increased by 1). In this way, the presence/absence of the event is counted at each sampling timing. The time detection unit 310 stores the count of event occurrence in a memory, and integrates the count for multiple times of projection of the measuring light by the light projecting unit 100 to create the histogram of the number of event occurrences with respect to the time from the projection of the measuring light.

When all projections of the measuring light by the light projecting unit 100 are finished, the time detection unit 310 detects the integration result of the count of the event, that is, the sampling timing when the histogram shows the peak of the count. The sampling timing shows a light receiving time T from the emission of the measuring light to the receiving of the reflected light. Note that, when the light receiving signal has a predetermined signal width or the like, the peak of the count included in the histogram has a finite width. In this case, the time detection unit 310 may detect the light receiving time T from the center position of the peak, the maximum position of the peak, or the position of a rising edge of the peak.

The calculation unit 320 calculates the distance to the target body based on the detection result of the light receiving time T by the time detection unit 310. The calculation unit 320 calculates the distance to the target body from the detection result of the light receiving time T by calculating Tc/2 (c is the speed of light). Since the time required for light to travel the distance equivalent to the round trip from the measurement position, where the measuring light is emitted, to the target body is the light receiving time T, the speed of light is multiplied by ½ the light receiving time T. The calculation result of the distance to the target body is transmitted to an evaluation unit 340.

The evaluation unit 340 is a unit that evaluates the reliability of the calculation result of the distance to the target body by the calculation unit 320 based on a deviation from a reference value indicated by reference information regarding the distance to the target body. When the distance detector 10 is operated by the user to project the measuring light toward the target body, the distance detector may accidentally project the measuring light to an object different from the target body. In other words, there is a case where there is an obstacle such as mesh, glass, mist, or the like in front of the target body, the measuring light is projected to the target body through the obstacle, and thus the distance to the target body is falsely detected. In such a case, the reliability of the calculation result is evaluated by the evaluation unit 340, so that the correct distance to the target body can be provided. The reliability evaluation of the calculation result of the distance to the target body by the evaluation unit 340 will be described later.

The reference information (and the reference value) regarding the distance to the target body is acquired based on the current position of the distance detector 10 and the position information of the target body. The reference information (and the reference value) is less accurate than the detection accuracy (that is, the detection accuracy of the light receiving time) of the distance to the target body by the distance detector 10, but has a reliability (that is, a producibility) as high as the acquired accuracy rarely changes, and for example, can be acquired using global positioning system (GPS) data as described later.

In a case where a plurality of calculation results of the distance to the target body, are obtained by the calculation unit 320, the evaluation unit 340 evaluates the reliability based on a deviation of the distance corresponding to each calculation result from the reference value regarding the distance to the target body, for each of the plurality of calculation results. The evaluation unit 340 may evaluate a calculation result, which shows a least deviation from the reference value (particular, the calculation result which matches with the reference value within the range of detection errors of the distance detector 10), as having the highest reliability.

The calculation result of the distance to the target body evaluated in reliability is transmitted to the display unit 141. With this configuration, the calculation result is displayed in the reticle plate 140, and the calculation result of the distance to the target body is superimposed on the image of the measured target body which the user has observed through the eyepiece lens 150.

The position receiving unit 350 is a unit which receives the position information regarding the current position of the distance detector 10. The position receiving unit 350 can acquire the current position by, for example, receiving a GPS signal or the like sent from a GPS satellite when the user presses the operation button 133 to start the distance measurement operation. The acquired position information of the current position is transmitted to the acquisition unit 360. Further, the position receiving unit 350 may indirectly receive the GPS signal via an external device independent of the distance detector 10 instead of directly receiving the GPS signal.

The acquisition unit 360 is a unit which acquires the position information of the target body. The position information of the target body can be acquired by specifying the target body in map information stored in a memory (not illustrated) or the like in advance, or by specifying the target body by wirelessly communicating with an external device which has map information. The map information may be information (latitude, longitude, azimuth, etc.) including the position information of an index object such as a building which serves as an index of position. Further, the map information may be downloaded from an external device independent of the distance detector 10 by wireless communication as needed instead of being stored in a memory or the like in advance. The acquisition unit 360 acquires the distance to the target body from the current position based on the position information of the current position and the position information of the target body received from the position receiving unit 350. The acquired distance is transmitted to the evaluation unit 340 as the reference value regarding the distance to the target body.

The setting unit 370 is a unit which sets a false detection range in which the time detection unit 310 may falsely detect the light receiving time T. As a cause of the false detection of the light receiving time T, for example, the use of the distance detector 10 in an environment where a mist has occurred is considered. It is known that the false detection range caused by a mist can be set uniquely in experience. For example, the false detection range may be fixed to a distance range of several meters to several tens of meters. The set false detection range is stored in a memory (not illustrated). The setting unit 370 may detect the intensity of mist and set the false detection range automatically or manually each time when the distance detector 10 is used.

In a case where the false detection range is set by the setting unit 370, the evaluation unit 340 reads the false detection range from a memory, and evaluates the reliability of the calculation result of the distance to the target body further based on the range. For example, the evaluation unit 340 evaluates a low reliability in a case where the calculation result of the distance to the target body is included in the false detection range.

The reliability evaluation of the calculation result of the distance to the target body by the evaluation unit 340 will be described.

FIGS. 3A to 6B show an example in the distance detection of the distance detector 10, illustrating a frequency histogram (upper part) showing the distance to the target body created by the time detection unit 310 and a reference value (lower part) indicated by the reference information regarding the distance to the target body. Further, the light receiving time (t) is converted into a distance (tc/2) in the frequency histogram. As described above, when the distance detector 10 is operated by the user to project the measuring light toward the target body, the distance detector may accidentally project the measuring light to an object different from the target body. In other words, there is a case where there is an obstacle such as mesh, glass, mist, or the like in front of the target body, the measuring light is projected to the target body through the obstacle, and thus the distance to the target body is falsely detected.

Figure 3A:
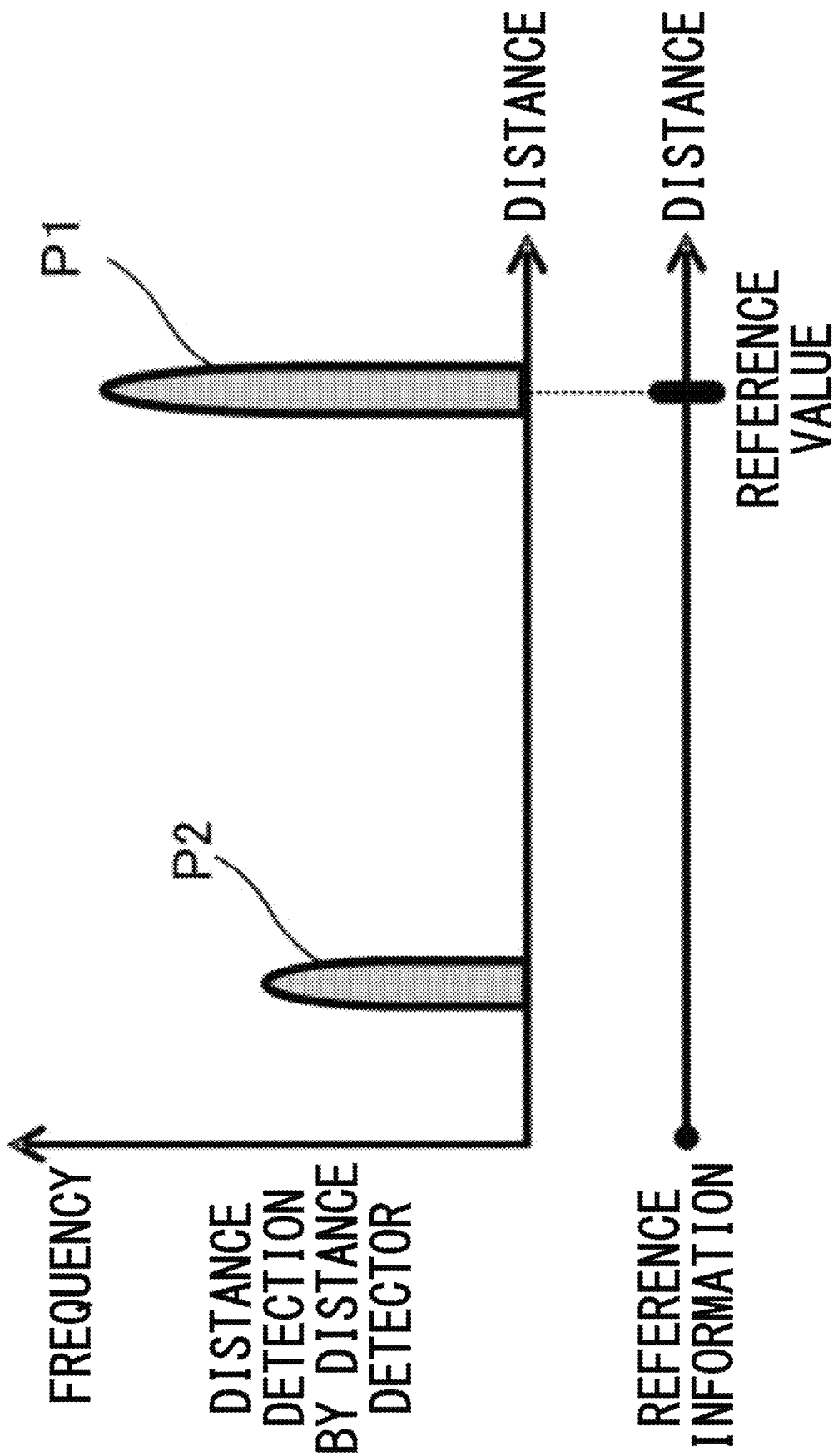
FIG. 3A is a diagram illustrating an example of reliability evaluation based on a frequency histogram (upper part) showing a distance to a target body created by a time detection unit and a deviation from a reference value (lower part) regarding a distance to the target body by an evaluation unit.
Figure 3B:
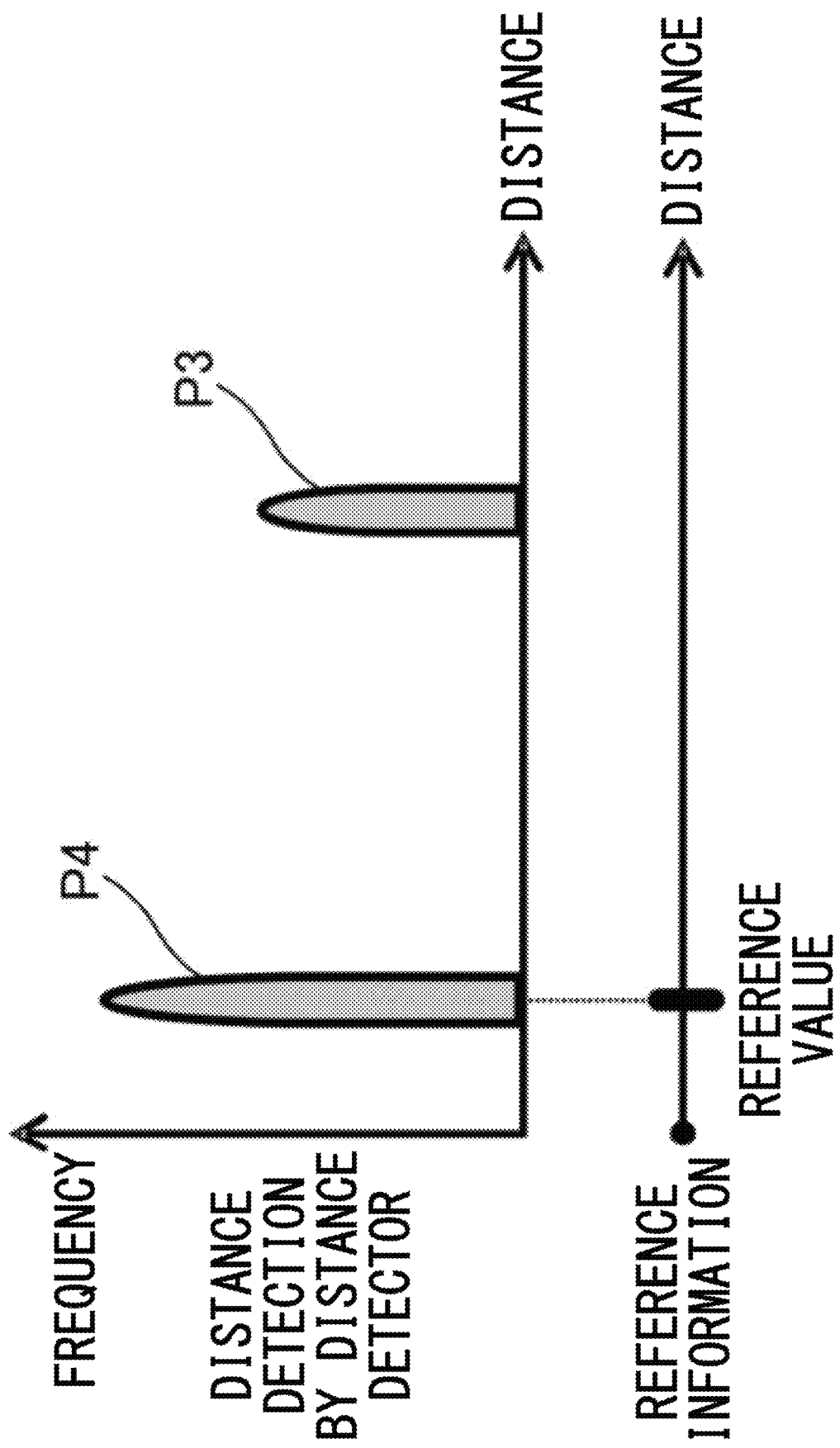
FIG. 3B is a diagram illustrating another example of the reliability evaluation based on the frequency histogram (upper part) showing a distance to a target body created by the time detection unit and a deviation from the reference value (lower part) regarding a distance to the target body by the evaluation unit.
Figure 3C:
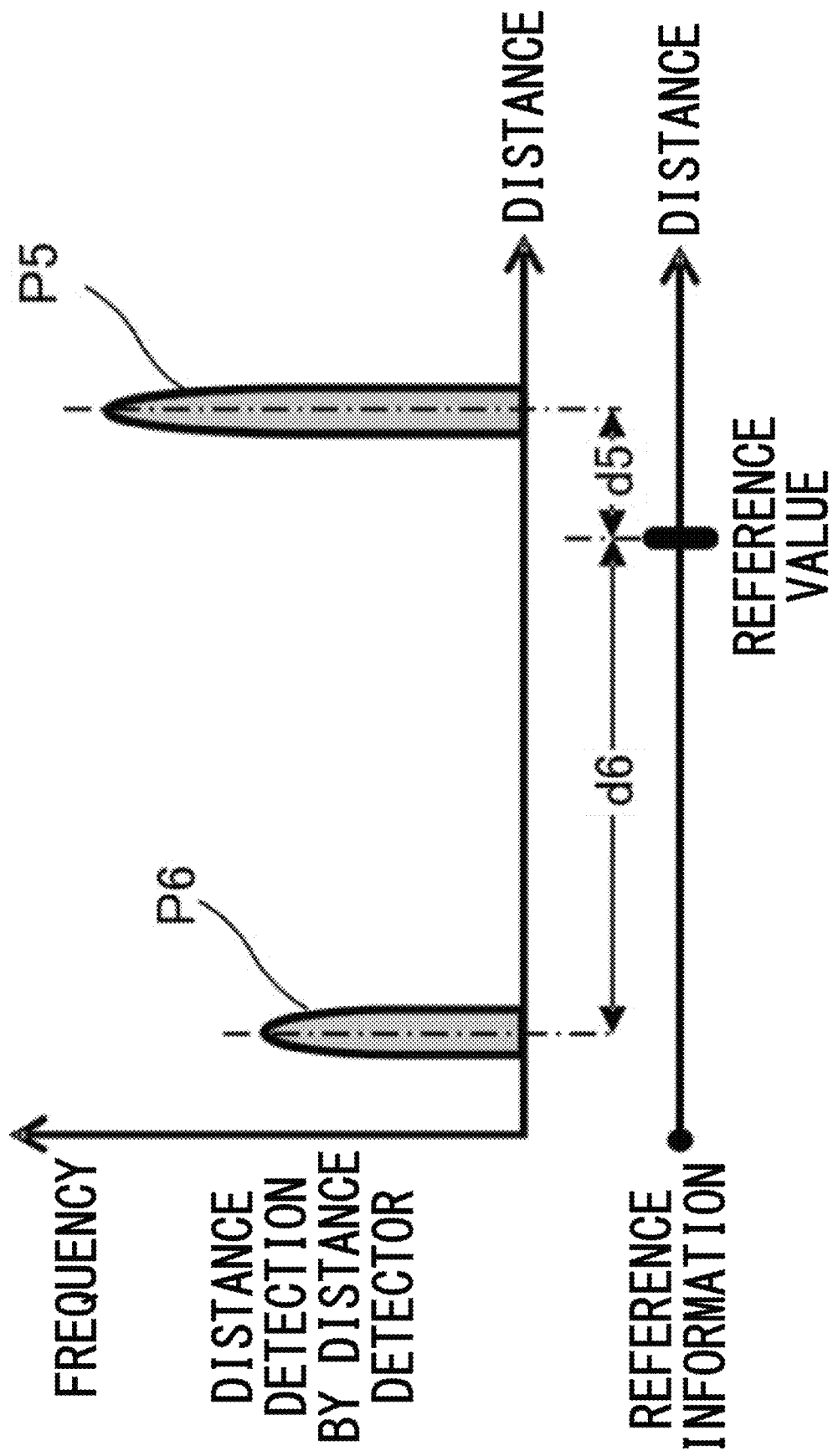
FIG. 3C is a diagram illustrating still another example of the reliability evaluation based on the frequency histogram (upper part) showing a distance to a target body created by the time detection unit and a deviation from the reference value (lower part) regarding a distance to the target body by the evaluation unit.

In the frequency histogram respectively shown in FIGS. 3A to 3C, a low peak P2, P3, or P6 caused by the reflected light from an obstacle appears together with a high peak P1, P4, or P5 caused by the reflected light from the target body. In this case, two calculation results of the distance to the target body are acquired by the calculation unit 320. Herein, since the height of peaks may be changed according to the distance, it is not reasonable to determine that the high peaks P1, P4, and P5 are peaks caused by the reflected light from the target body. Therefore, the evaluation unit 340 evaluates the reliability of each of the plurality of calculation results based on the reference value indicated by the reference information regarding the distance to the target body.

In the example illustrated in FIG. 3A, the reference value indicated by the reference information matches with the distance (the calculation result of the distance) shown by the peak P1 in the two peaks P1 and P2. The evaluation unit 340 evaluates that the reliability of the distance (the calculation result of the distance) shown by the peak P1 is high, selects the calculation result as a final result, and causes the display unit 141 to display the result as the distance to the target body. On the other hand, in the example illustrated in FIG. 3B, the reference value indicated by the reference information matches with the distance (the calculation result of the distance) shown by the peak P4 in the two peaks P3 and P4. The evaluation unit 340 evaluates that the reliability of the distance (the calculation result of the distance) shown by the peak P4 is high, selects the calculation result as a final result, and causes the display unit 141 to display the result as the distance to the target body. In this way, it is possible to provide the correct distance to the target body by selecting the calculation result having a high reliability from among the plurality of calculation results.

In the example illustrated in FIG. 3C, the reference value indicated by the reference information does not match with any of the distances (the calculation results of the distance) shown by two peaks P5 and P6. In this way, in a case where a plurality of calculation results of the distance to the target body are obtained by the calculation unit 320, the evaluation unit 340 evaluates the reliability of each of the plurality of calculation results based on a deviation from the reference value indicated by the reference information regarding the distance to the target body. Herein, the evaluation unit 340 evaluates the reliability to be higher as the deviation from the reference value is smaller. The evaluation unit 340 calculates deviations d5 and d6 from the reference value respectively with respect to the peaks P5 and P6, evaluates that the peak P5 giving the minimum deviation d5 compared to the deviations is a peak caused by the reflected light from the target body and the reliability of the distance (the calculation result of the distance) indicated by this peak is highest, and selects the calculation result as a final result and causes the display unit 141 to display the distance to the target body. In this way, it is possible to provide the correct distance to the target body by selecting the calculation result having a high reliability from among the plurality of calculation results. In addition, even in a case where the calculation result and the reference information both do not have a range, the reliability of the calculation result can be evaluated by evaluating the reliability of the calculation result of the distance based on the deviation from the reference value, that is, by evaluating the reliability based not only on the presence/absence of deviation but also on the degree of the case where there is a deviation.

Figure 4A:
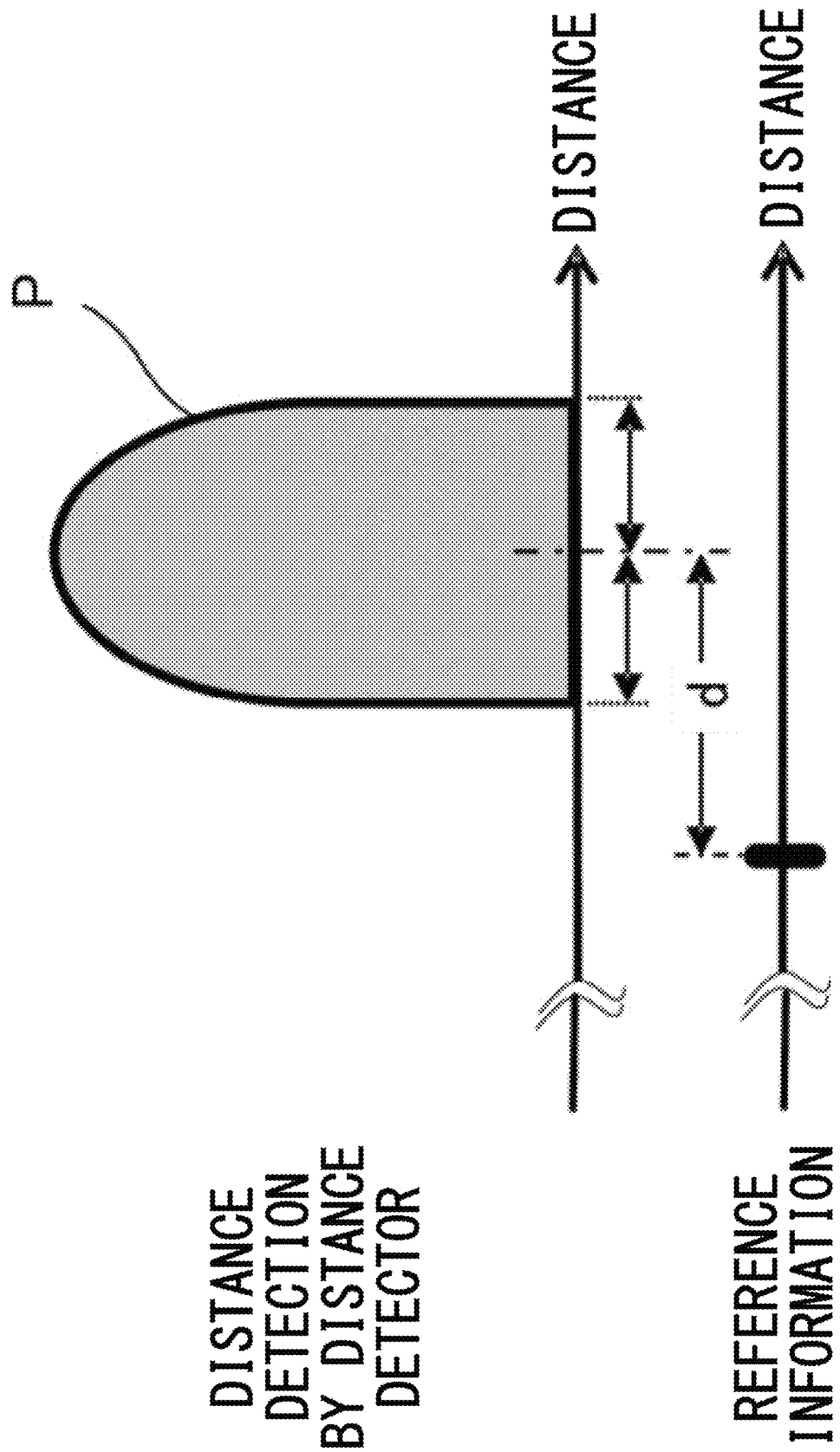
FIG. 4A is a diagram illustrating an example of the reliability evaluation of a calculation result in a case where a peak shown in the frequency histogram has a finite width.
Figure 4B:
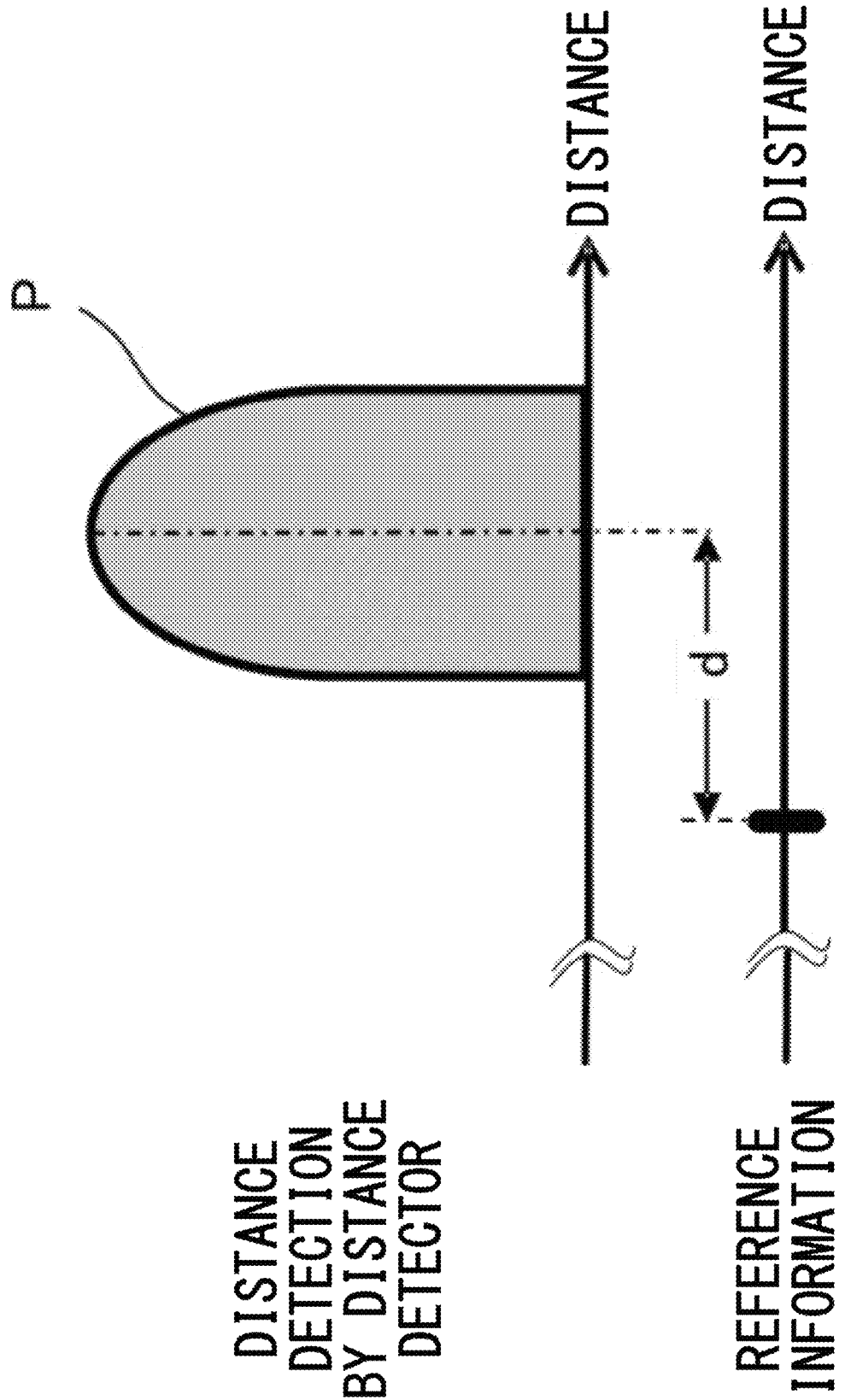
FIG. 4B is a diagram illustrating another example of the reliability evaluation of the calculation result in a case where the peak shown in the frequency histogram has a finite width.
Figure 4C:
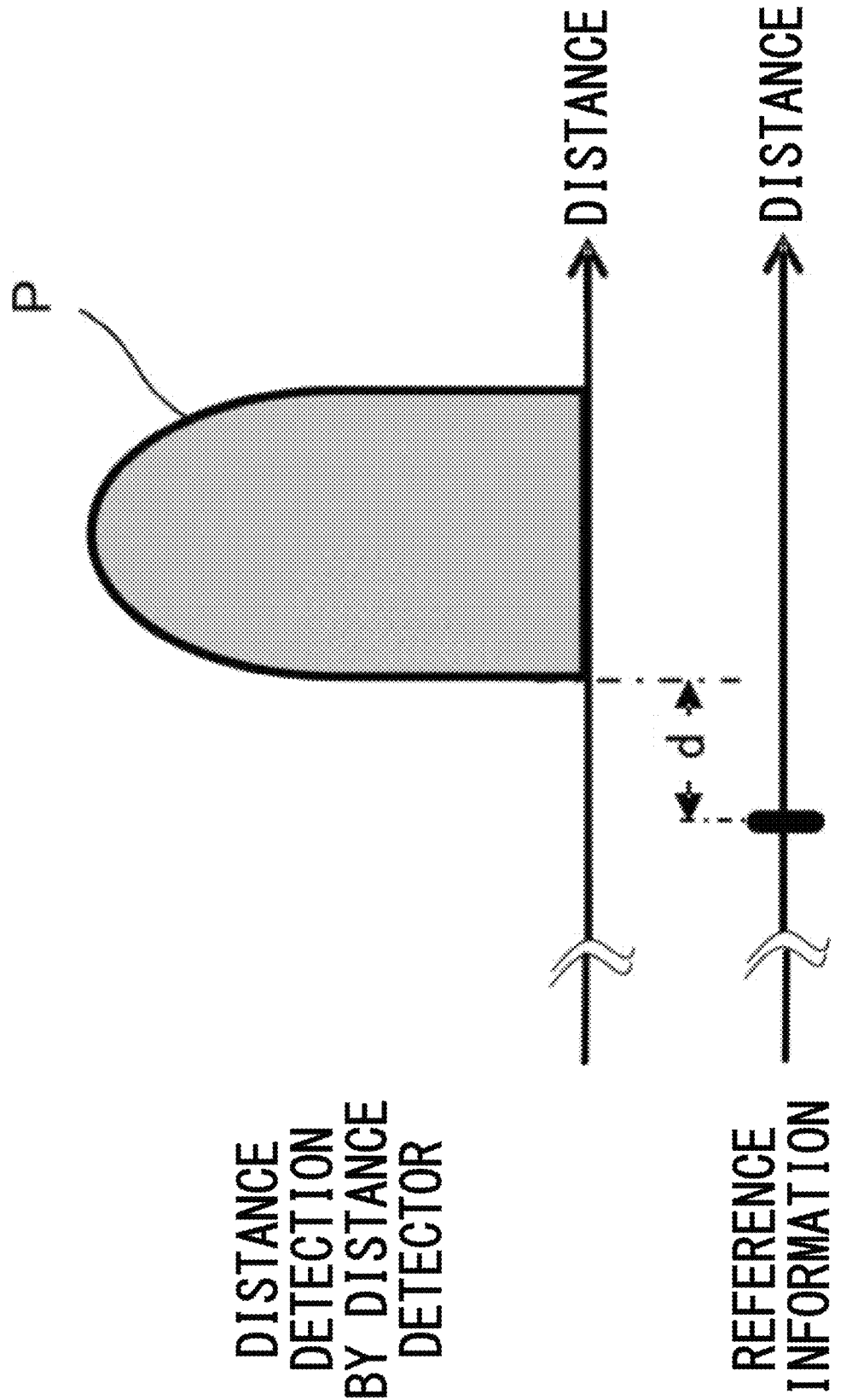
FIG. 4C is a diagram illustrating still another example of the reliability evaluation of the calculation result in a case where the peak shown in the frequency histogram has a finite width.

FIGS. 4A to 4C show an example of the reliability evaluation of the calculation result in a case where the peak appearing in the frequency histogram has a finite width. In the example shown in FIG. 4A, the time detection unit 310 calculates the width of the peak P, and detects the center position thereof as the light receiving time T. In such a case, the evaluation unit 340 calculates a deviation d from the reference value with respect to the distance corresponding to the center position of the peak P. In the example shown in FIG. 4B, the time detection unit 310 detects the maximum position of the peak P as the light receiving time T. In such a case, the evaluation unit 340 calculates a deviation d from the reference value with respect to the distance corresponding to the maximum position of the peak P. In the example shown in FIG. 4C, the time detection unit 310 detects the position of the rising edge (the edge on a side where the distance is small) of the peak P as the light receiving time T. In such a case, the evaluation unit 340 calculates a deviation d from the reference value with respect to the distance corresponding to the position of the rising edge the peak P. In a case where a plurality of peaks appear in the frequency histogram, the evaluation unit 340 evaluates the reliabilities of the plurality of calculation results based on the deviation d thus calculated.

Figure 5:
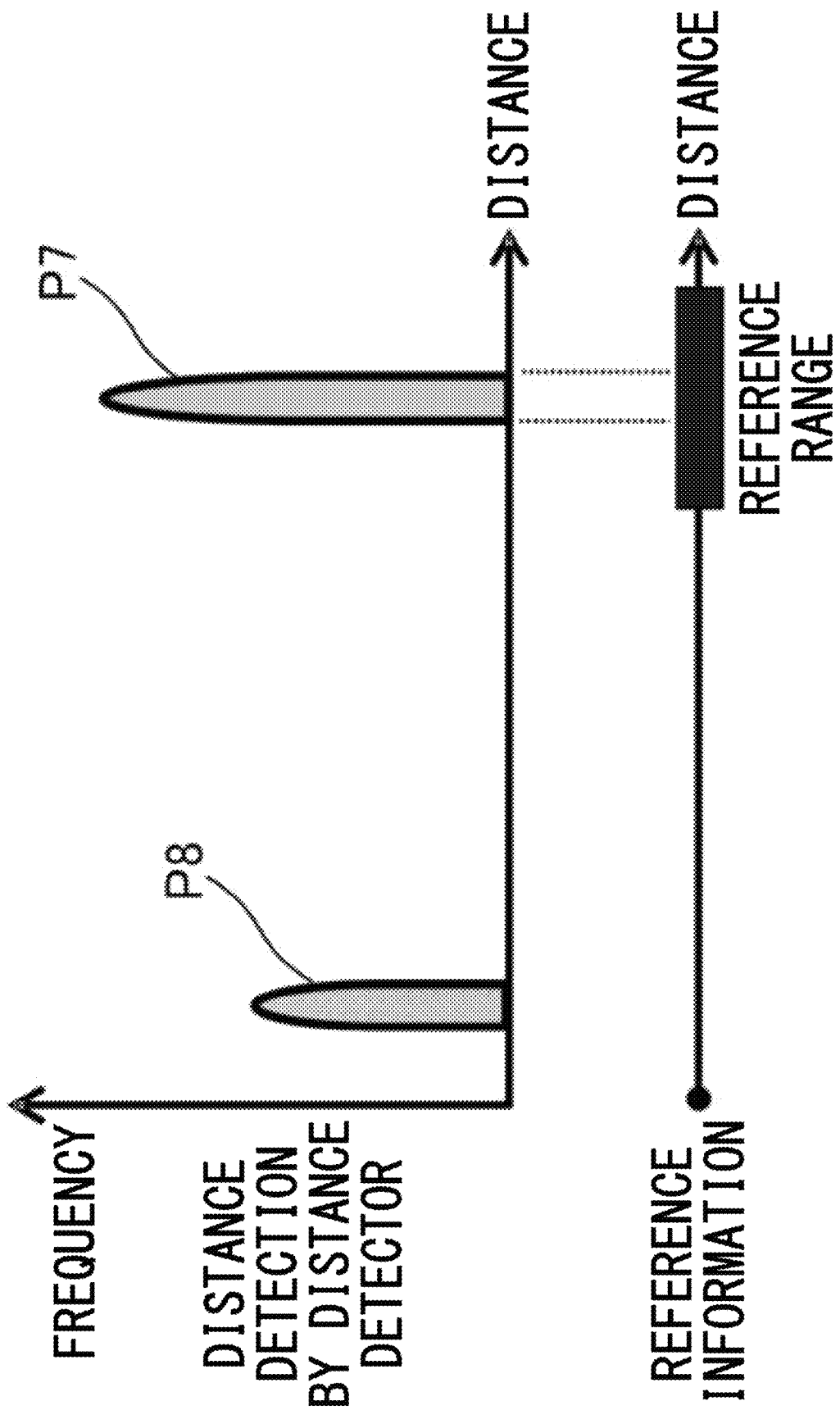
FIG. 5 is a diagram illustrating an example of the reliability evaluation of the calculation result in a case where reference information regarding the distance to the target body indicates a finite distance range.

FIG. 5 shows an example of the reliability evaluation of the calculation result in a case where reference information regarding the distance to the target body indicates a finite distance range. For example, in a case where a flag on the green of a golf course is the target body, the position of the flag, that is, the cup, can be changed every day, so a distance range before and after the green where the flag can be located may be acquired as the reference information based on the current position of the distance detector 10 and the position information of the target body. In such a case, the reference information indicates a reference range having a finite distance width. In a case where a plurality of peaks P7 and P8 appear in the frequency histogram, the evaluation unit 340 evaluates that the peak P7 located within the reference range is a peak caused by the reflected light from the target body and the reliability of the distance (the calculation result of the distance) indicated by this peak is highest, and selects the calculation result as a final result and causes the display unit 141 to display the distance to the target body.

Further, in a case where a plurality of peaks appear within the reference range indicated by the reference information, the distance indicated by each peak is calculated, the shortest distance or the longest distance may be selected from among the calculation results and displayed in the display unit 141 as the distance to the target body. In such a case, the user may set the selection of whether to display the shortest distance or the longest distance on the display unit 141 before use.

Further, in a case where the current position of the distance detector 10 is acquired by receiving a GPS signal or the like sent from a GPS satellite, the reference information may have the finite distance width with an error due to an error that occurs when receiving the GPS signal. Therefore, assuming that the peak located within the finite error range is a peak caused by the reflected light from the target body, the evaluation unit 340 may evaluate the reliability of the distance (the calculation result of the distance) shown by this. Further, in a case where the reference information includes an error of the finite distance width, the evaluation unit 340 may obtain the center position of the distance width of the reference information, and evaluate the reliability of each of the plurality of calculation results based on the distance corresponding to the calculation result and the deviation of the center position of the reference information regarding the distance to the target body.

Figure 6A:
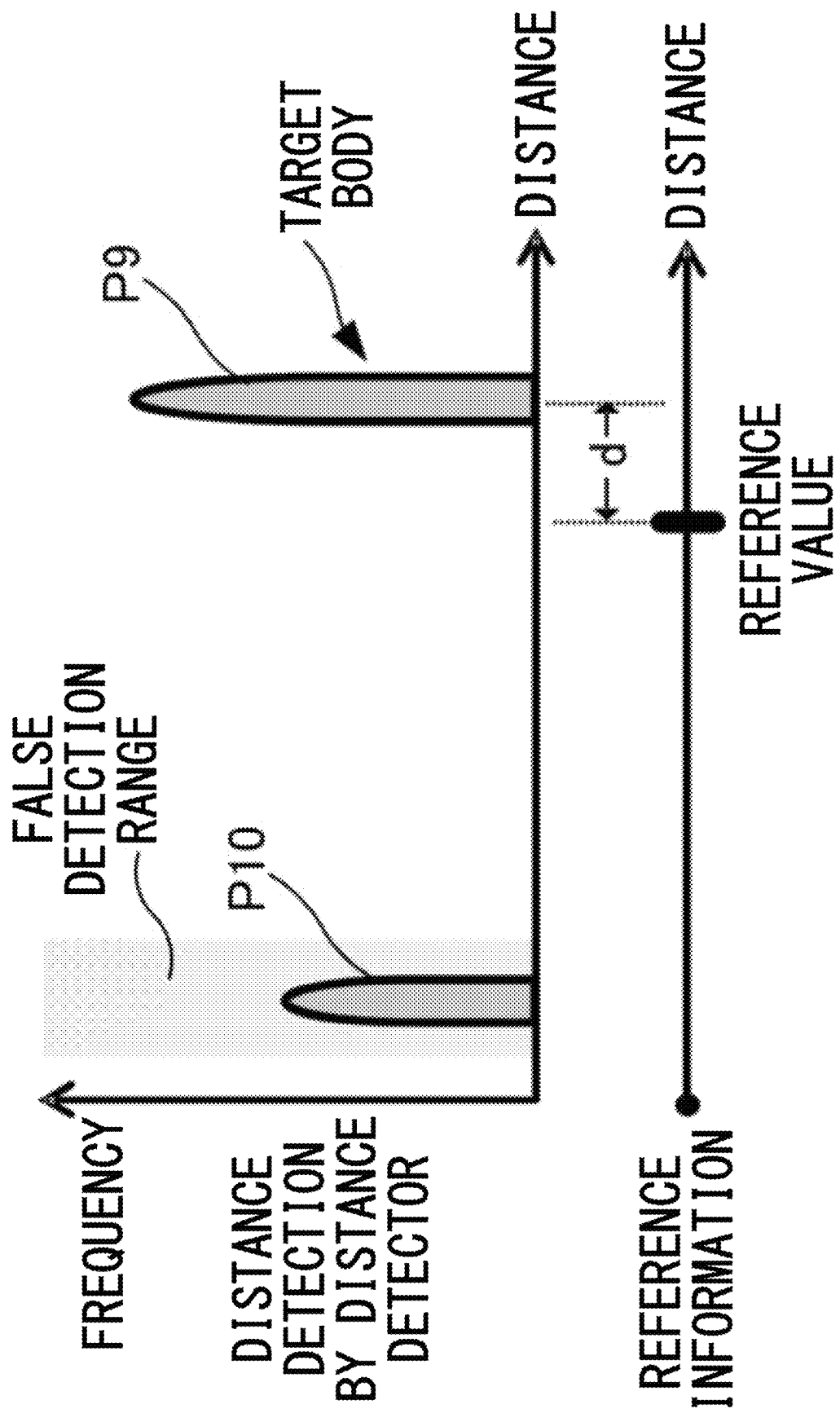
FIG. 6A is a diagram illustrating an example of the reliability evaluation of the calculation result in a case where a false detection range caused by mist or the like is set by a setting unit.
Figure 6B:
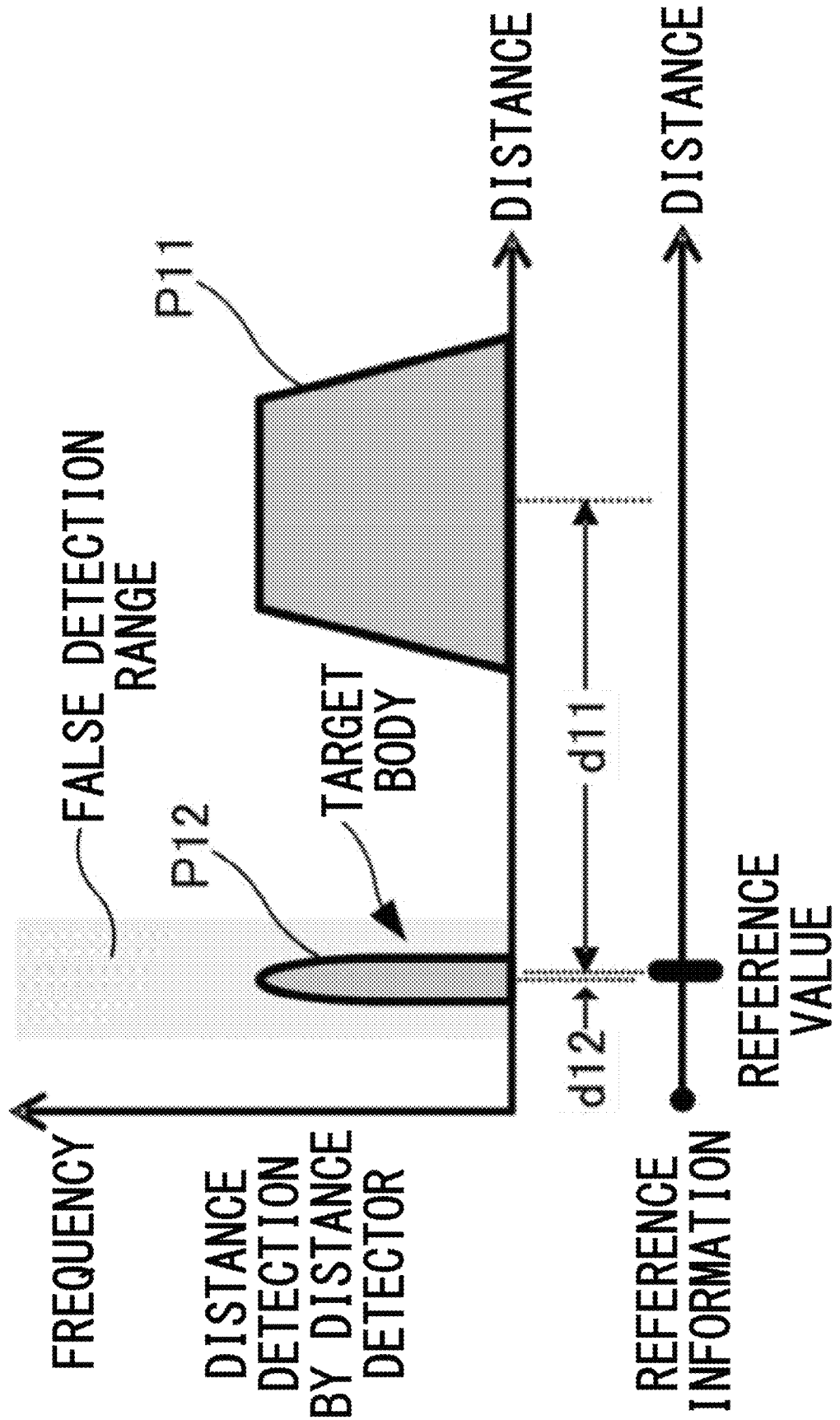
FIG. 6B is a diagram illustrating another example of the reliability evaluation of the calculation result in a case where the false detection range caused by mist or the like is set by the setting unit.

FIGS. 6A and 6B show an example of the reliability evaluation of the calculation result in a case where a false detection range caused by mist or the like is set by the setting unit 370. In the frequency histogram shown in these drawings, the false peak P10 or P11 accompanying with the scattered light from a mist appears together with the peak P9 or P12 caused by the reflected light from the target body.

In the example shown in FIG. 6A, the peak P9 caused by the reflected light from the target body is outside the false detection range, and the false peak P10 accompanying with the scattered light from a mist is included in the false detection range. In such a case, the evaluation unit 340 reads the false detection range from a memory, and evaluates the reliability of the calculation result of the distance to the target body further based on the range. For example, the evaluation unit 340 determines whether the reference value indicated by the reference information regarding the distance to the target body overlaps with the false detection range. In a case where it is determined that the distance indicated by the reference value overlaps with the false detection range, the evaluation unit 340 evaluates the reliability in a case where the distance indicated by the peak P10 (the calculation result of the distance) is included in the false detection range regardless of a large or small deviation from the reference value. Since the false detection range is a default value (fixed value), the reliability evaluation process can be performed efficiently. As a result, the evaluation unit 340 substantially calculates the deviation d only from the reference value with respect to the peak P9 located outside the false detection range and, based on this, the reliability of the distance (the calculation result of the distance) indicated by the peak P9 is evaluated.

In the example shown in FIG. 6B, the false peak P11 accompanying with the scattered light from a mist is outside the false detection range, and the peak P12 caused by the reflected light from the target body is included in the false detection range. In such a case, the evaluation unit 340 reads the false detection range from a memory, and evaluates the reliability of the calculation result of the distance to the target body further based on the range. For example, the evaluation unit 340 determines whether the reference value indicated by the reference information regarding the distance to the target body overlaps with the false detection range. In a case where it is determined that the distance indicated by the reference value overlaps with the false detection range, the evaluation unit 340 evaluates that the reliability of the peak P12 (the calculation result of the distance) included in the false detection range is high, or does not evaluate that the reliability is low. In other words, the evaluation unit 340 calculates the deviations d11 and d12 from the reference value respectively with respect to the peaks P11 and P12 regardless of whether the peaks P11 and P12 are included in the false detection range, and substantially evaluates the reliabilities of the distances (the calculation result of the distance) indicated by the peaks P11 and P12 based only on the deviation from the reference value. In such a case, the deviation from the reference value satisfies d12<<d11 regardless of whether the peak P12 is included in the false detection range. Therefore, the evaluation unit 340 evaluates that the peak P12 is a peak caused by the reflected light from the target body, and the reliability of the distance (the calculation result of the distance) indicated by the peak is highest.

In this way, even in a case where the peak (the calculation result of the distance to the target body) appearing in the frequency histogram is included in the false detection range, the distance indicated by the reference value overlaps with the false detection range, so that it is possible to avoid that the reliability of the calculation result is evaluated unreasonably low and possible to detect the distance with high precision.

Figure 7:
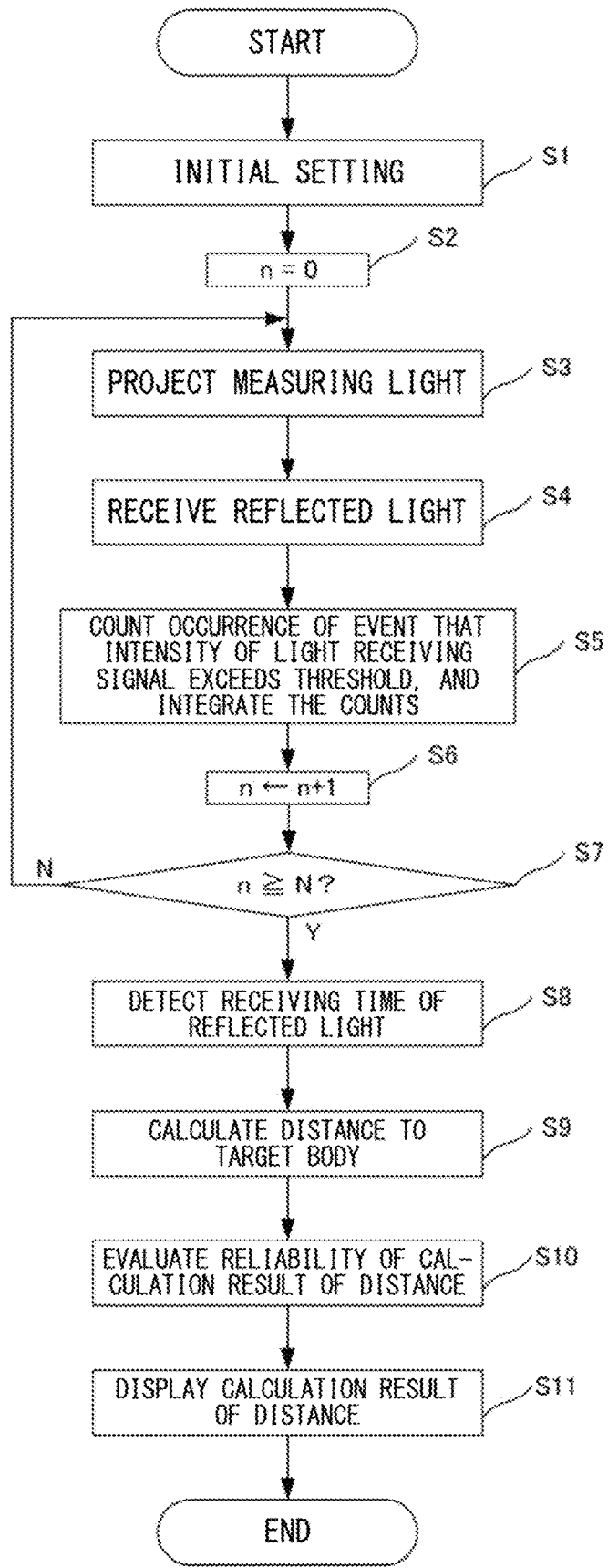
FIG. 7 is an operational flow of a distance detection method which is executed by the distance detector according to this embodiment.

FIG. 7 shows an operational flow of a distance detection method which is executed by the distance detector 10 according to this embodiment. The operational flow is started by the control unit 132 when the user presses the operation button 133. Further, it is assumed that the measuring light is projected multiple times (N>>1) in one distance detection.

In Step S1, an initial setting is performed. For example, the position receiving unit 350 receives the GPS signal sent from a GPS satellite to receive the position information regarding the current position of the distance detector 10. The acquisition unit 360 specifies the target body in map information stored in a memory (not illustrated) or the like in advance, or specifies the target body by wirelessly communicating with an external device which has map information so as to acquire the position information of the target body. The acquisition unit 360 acquires the distance to the target body from the current position based on the position information of the current position and the position information of the target body. The setting unit 370 may set a false detection range which may cause the time detection unit 310 to falsely detect the light receiving time due to a mist or the like.

In Step S2, the control unit 132 initializes a counter n (setting to zero).

In Step S3, the light projecting unit 100 projects the measuring light toward the target body.

In Step S4, the light receiving unit 200 receives the measuring light reflected by the target body, that is, the reflected light.

In Step S5, the processing unit 300 (the time detection unit 310) periodically counts the event where the intensity of the light receiving signal obtained by receiving the reflected light by the light receiving unit 200 in Step S4 exceeds a threshold from each projecting of the measuring light by the light projecting unit 100 with respect to the projecting of the measuring light by the light projecting unit 100 in Step S3, integrates the count, and stores the integration result in a memory.

In Step S6, the control unit 132 increases the counter n by 1.

In Step S7, the control unit 132 determines whether the counter n is equal to or more than N. In a case where the counter n is less than N, the process returns to Step S3, and Step S3 to S7 is repeatedly performed. In other words, the light projecting unit 100 projects the measuring light N times toward the target body. The processing unit 300 periodically counts the event where the intensity of the light receiving signal exceeds a threshold from each projecting of the measuring light with respect to the projecting of the measuring light by the light projecting unit 100, and integrates the count with respect to N times of projection of the measuring light. With this configuration, after N times of projection, the frequency histogram showing the distance to the target body is created.

In a case where the counter n is equal to or more than N, the process proceeds to the next Step S8.

In Step S8, the time detection unit 310 detects the light receiving time T from the projecting of the measuring light by the light projecting unit 100 to the receiving of the reflected light by the light receiving unit 200 using the frequency histogram showing the distance to the target body created in Steps S3 to S7. The details of detection of the light receiving time T are as described above.

In Step S9, the calculation unit 320 calculates the distance to the target body Tc/2 (c is the speed of light) based on the detection result of the light receiving time T obtained in Step S8.

In Step S10, the evaluation unit 340 evaluates the reliability of the calculation result of the distance to the target body based on the deviation from the reference value regarding the distance to the target body of the distance corresponding to the calculation result. In a case where a plurality of calculation results of the distance to the target body are obtained in Step S9, the evaluation unit 340 evaluates the reliability of each of the plurality of calculation results based on the deviation from the reference value regarding the distance to the target body of the distance corresponding to the calculation result, and selects a calculation result having a high reliability from among the plurality of calculation results based on the evaluation result. Herein, the evaluation unit 340 evaluates the reliability to be higher as the deviation from the reference value is smaller, and thus a calculation result having a smallest deviation from the reference value is selected. The reliability evaluation of the calculation result based on the deviation from the reference value is as described above.

In Step S11, the evaluation unit 340 transmits the calculation result of the distance to the target body evaluated in reliability to the display unit 141. With this configuration, the calculation result is displayed in the reticle plate 140, and the operational flow of the distance measurement method is ended.

The distance detector 10 of this embodiment includes the light projecting unit 100 which projects light toward the target body, the light receiving unit 200 which receives the reflected light from the target body, the time detection unit 310 which detects the light receiving time from the projecting of the measuring light by the light projecting unit 100 to the receiving of the reflected light by the light receiving unit 200, the calculation unit 320 which calculates the distance to the target body based on the detection result of the light receiving time by the time detection unit 310, and the evaluation unit 340 which evaluates the reliability of the calculation result of the distance to the target body by the calculation unit 320 based on the deviation of the distance corresponding to the calculation result from the reference value regarding the distance to the target body. In a case where there is a concern of false detection of the light receiving time by the time detection unit 310, the reliability of the calculation result of the distance to the target body by the calculation unit 320 is evaluated based on the deviation from the reference value regarding the distance to the target body, so that it is possible to provide the correct distance to the target body from the calculation result in which the reliability is evaluated.

Further, instead of selecting one result having a high reliability from among the plurality of calculation results, a result in which the reliability is equal to or more than a threshold may be selected. In a case where the reliability does not exceed the threshold, an error may be displayed. By this method, even in a case where there is one calculation result, the reliability can be evaluated.

Figure 8:
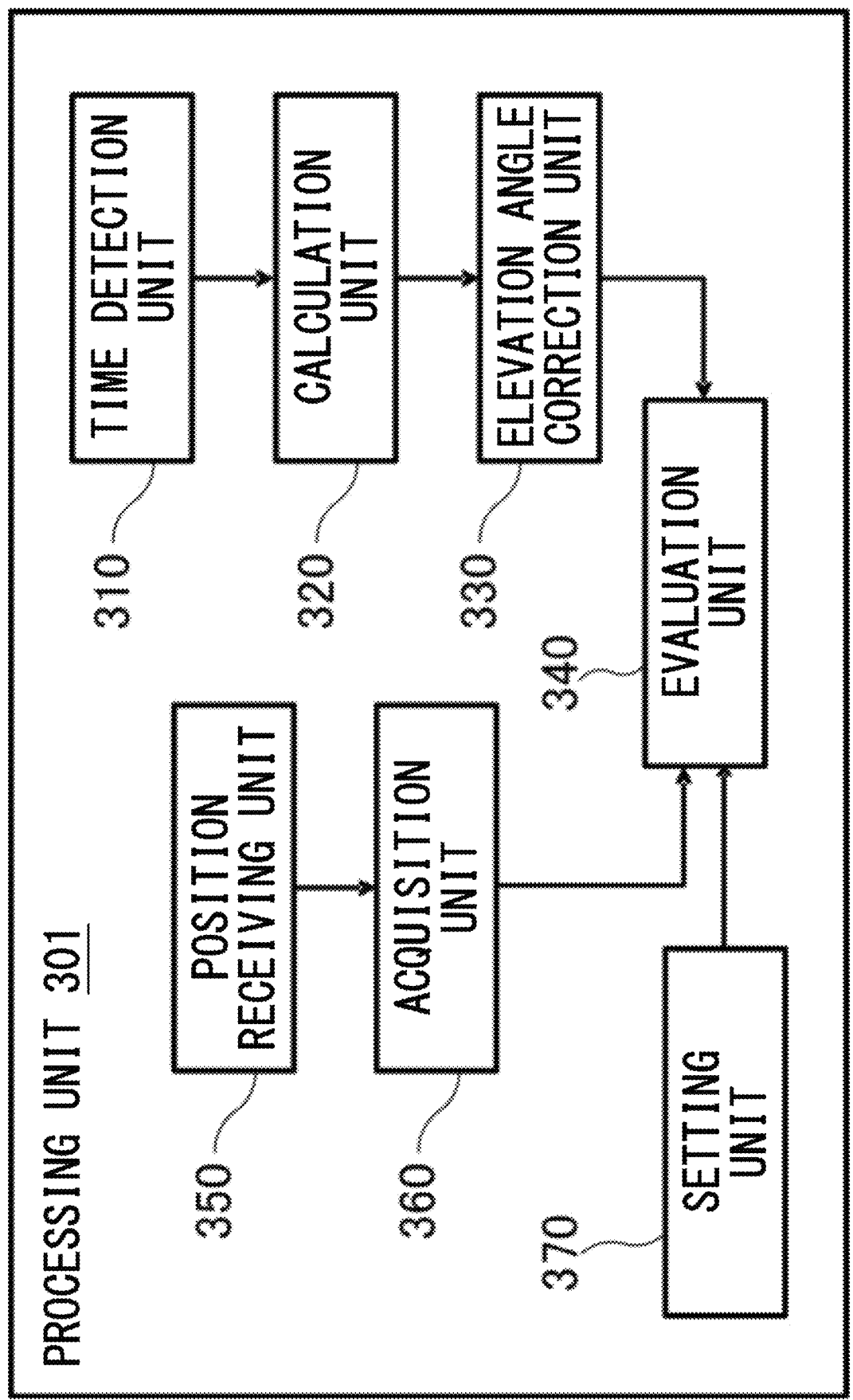
FIG. 8 is a diagram illustrating a functional configuration of a processing unit according to a modification.
Figure 9:
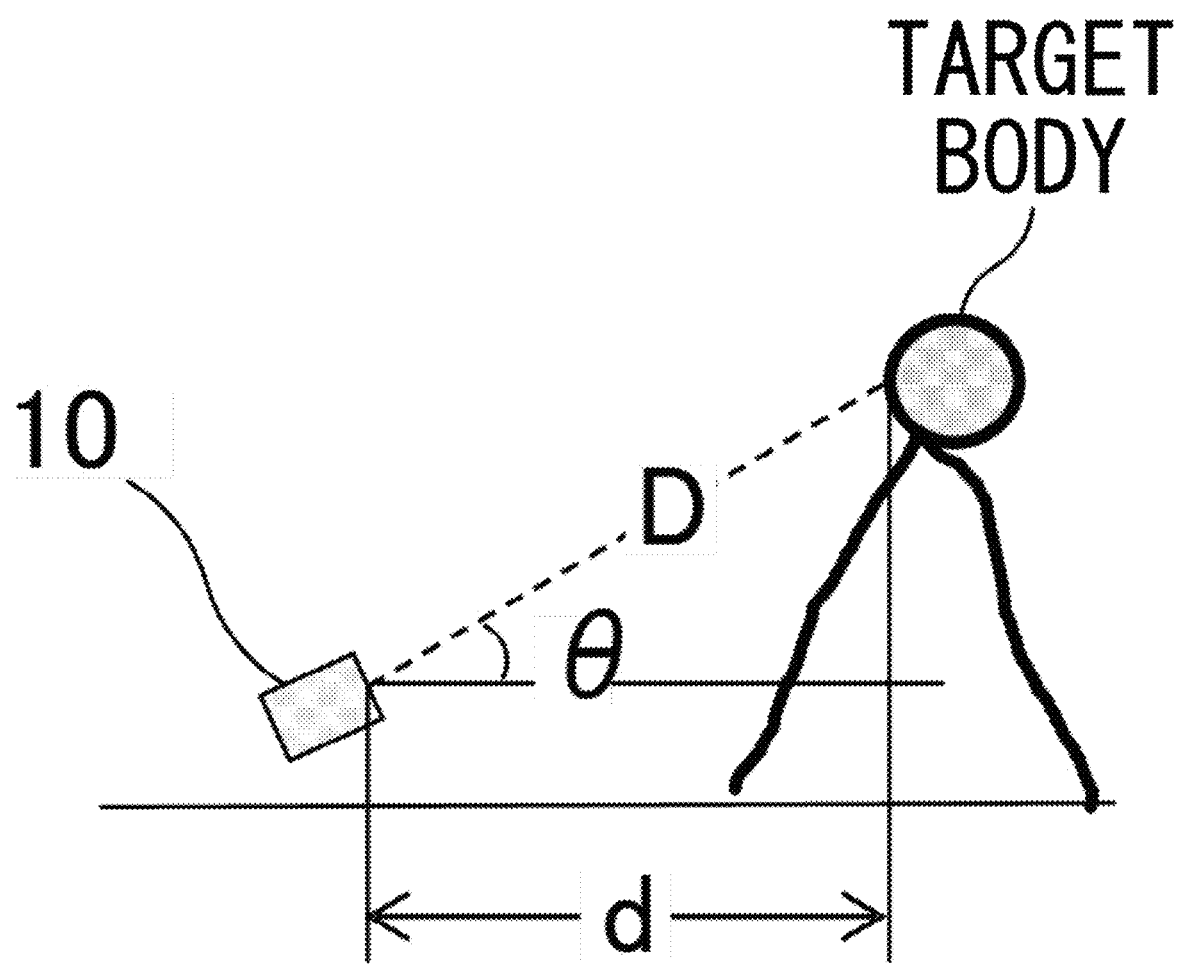
FIG. 9 is a diagram illustrating distance detection in consideration of a slope in a case where the target body is located above or below a distance detector.

FIG. 8 shows a functional configuration of a processing unit 301 according to a modification. The processing unit 301 further includes an elevation angle correction unit 330 with respect to the processing unit 300 according to the embodiment described above. For example, as shown in FIG. 9, in a case where the target body is located above or below the distance detector 10, the horizontal distance to the target body is necessarily detected in consideration of the slope of the optical axis with respect to the horizontal plane. Therefore, the elevation angle correction unit 330 detects an elevation angle $\theta$ by a gyro sensor or the like, and calculates the horizontal distance $d=D\cos(\theta)$ using the elevation angle $\theta$ and the calculation result of a direct distance D to the target body output from the calculation unit 320. The calculation result of the horizontal distance d is transmitted to the evaluation unit 340 as the distance to the target body. Further, in a case where a plurality of calculation results are obtained, the horizontal distance $d=D\cos(\theta)$ may be calculated for each calculation result using D as the calculation result.

Further, in a case where the distance to the target body of which the position is not possible to be specified on the map information is detected, the user first sets an index such as a building which can specify the position on the map information. Next, the user moves to the position of the target body while carrying the distance detector 10. Then, the user detects the distance to the building which has been set as an index using the distance detector 10. At this time, the position information regarding the current position of the distance detector 10 can be acquired by receiving a GPS signal or the like which is sent from a GPS satellite. The position information of the index is specified from the map information. The reference value regarding the distance to the target body can be acquired from the index based on the index of the position information of the current position and the position information. By detecting the distance in this way, the reliability of the calculation result of the distance from the index to the target body can be evaluated based on the deviation from the reference value regarding the distance from the index to the target body even in a case where the target body is not possible to be specified on the map information.

Various embodiments of the invention may be described with reference to a flowchart and a block diagram. The block may be (1) a step of the process in which the operation is performed, or (2) a section of a device which serves to execute the operation. The specific step and section may be mounted in a dedicated circuit, which is supplied together with a computer-readable instruction stored on a computer-readable medium, and/or a processor which is supplied together with a computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including a logical AND, a logical OR, a logical XOR, a logical NAND, a logical NOR, memory elements such as other logical operations, flip-flops, registers, field programmable gate arrays (FPGAs), programmable logic arrays (PLAs), and the like.

The computer-readable medium may include any tangible device that can store instructions executed by the appropriate device, and as a result, the computer-readable medium having instructions stored in the device includes an instruction that can be executed to create a means for performing the operation designated in a flowchart or block diagram. Examples of the computer-readable medium may include electronic storage medium, magnetic storage medium, optical storage medium, electromagnetic storage medium, semiconductor storage medium, and the like. More specific examples of the computer-readable medium may include floppy (registered trademark) disks, diskettes, hard disks, random access memories (RAM), read-only memories (ROM), erasable programmable read-only memories (EPROM or flash memory), electrically erasable programmable read-only memories (EEPROM), static random access memories (SRAM), compact disk read-only memories (CD-ROM), digital versatile disks (DVD), Blu-ray (registered trademark) disks, memory sticks, integrated circuit cards, and the like.

The computer-readable instructions may include either source code or object code written in any combination of one or more programming languages, including assembler instructions, instruction set architecture (ISA) instructions, machine instructions, machine-dependent instructions, microcode, firmware instructions, state setting data, or object-oriented programming languages such as Smalltalk (registered trademark), JAVA (registered trademark), C++, etc., and traditional procedural programming languages such as "C" programming languages or similar programming languages.

The computer-readable instructions are provided locally or over a wide area network (WAN) such as a local area network (LAN), the Internet, etc., for processors or programmable circuits of general purpose computers, special purpose computers, or other programmable data processors. A computer-readable instruction may be executed to create a means for performing an operation specified in a flowchart or block diagram. Examples of processors include computer processors, processing units, microprocessors, digital signal processors, controllers, microcontrollers, and the like.

Figure 10:
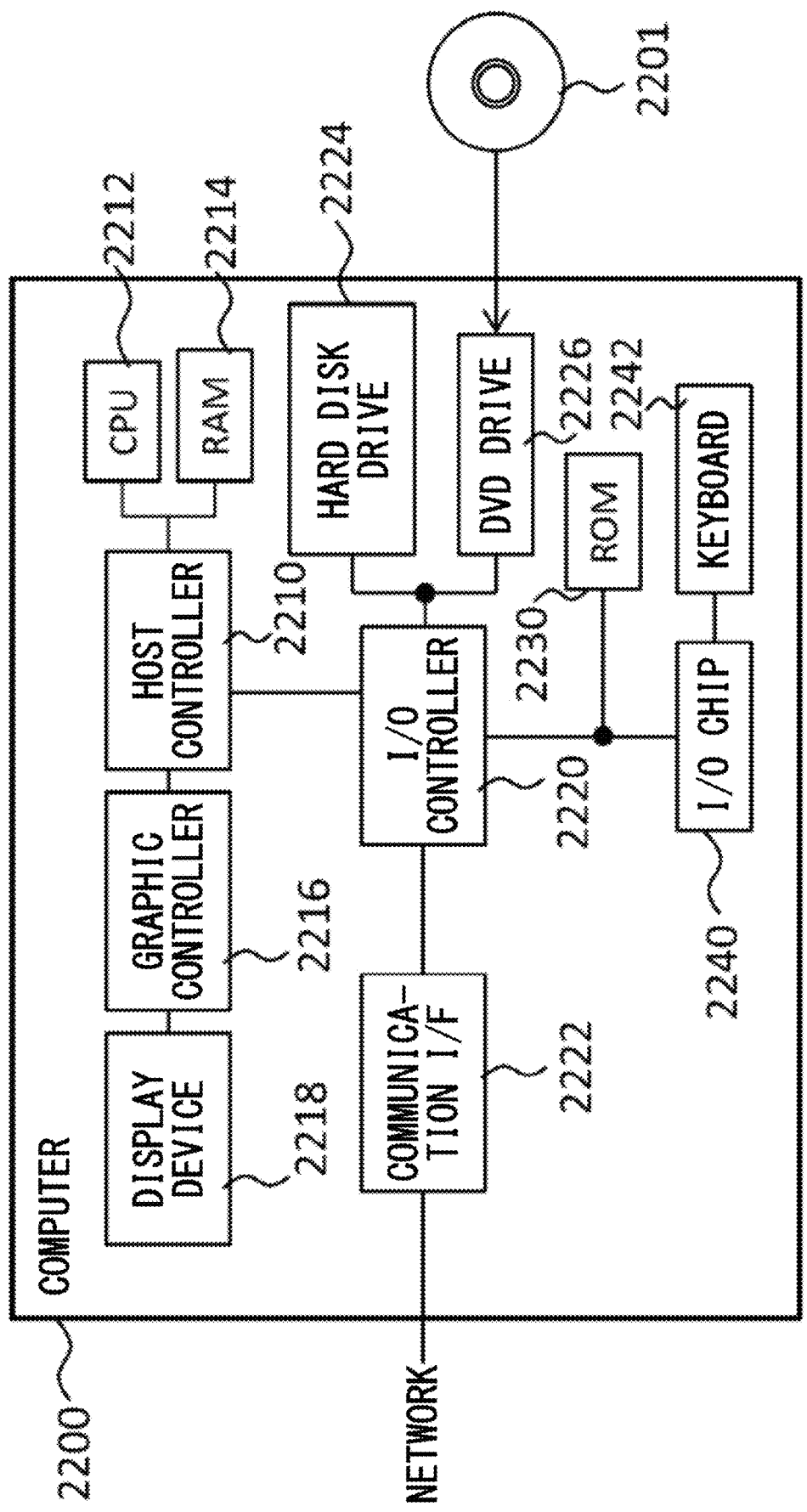
FIG. 10 is a diagram illustrating an example of the configuration of a computer according to this embodiment.

FIG. 10 shows an example of a computer 2200 in which a plurality of embodiments of the present invention may be embodied in whole or in part. A program installed on the computer 2200 can cause the computer 2200 to perform operations associated with the device according to the embodiments of the invention or to function as one or more sections of the device, may cause the computer 2200 to perform the operations or the one or more sections, and/or may cause the computer 2200 to perform the process according to the embodiments of the invention or the steps of the process. Such a program may be executed by a CPU 2212 to have the computer 2200 perform a specific operation associated with some or all of the flowchart and the blocks of the block diagram described in this specification.

The computer 2200 according to this embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to a program stored in the ROM 2230 and RAM 2214, thereby controlling each unit. The graphic controller 2216 acquires image data generated by the CPU 2212 in a frame buffer or the like provided in the RAM 2214 or itself, so that the image data is displayed on the display device 2218.

The communication interface 2222 communicates with other electronic devices over a network. The hard disk drive 2224 stores programs and data used by the CPU 2212 in the computer 2200. The DVD-ROM drive 2226 reads the program or data from a DVD-ROM 2201 and provides the program or data to the hard disk drive 2224 via the RAM 2214. The IC card drive reads the program and data from the IC card and/or writes the program and data to the IC card.

The ROM 2230 stores in it a boot program or the like executed by the computer 2200 when activated, and/or a program that depends on the hardware of the computer 2200. The input/output chip 2240 may also connect various input/output units to the input/output controller 2220 via a parallel port, serial port, keyboard port, mouse port, or the like.

The program is provided by a computer-readable medium such as the DVD-ROM 2201 or IC card. The program is read from a computer-readable medium, installed on the hard disk drive 2224, RAM 2214, or ROM 2230 which are also examples of the computer-readable medium, and executed by the CPU 2212. The information processing described in these programs is read on the computer 2200, resulting in cooperation between the program and the various types of hardware resources described above. The device or method may be configured by realizing the operation or processing of information according to the use of the computer 2200.

For example, when communication is performed between the computer 2200 and an external device, the CPU 2212 executes a communication program loaded into the RAM 2214 and may order the communication interface 2222 to perform communication processing based on the processing described in the communication program. Under the control of the CPU 2212, the communication interface 2222 reads the transmission data stored in the transmission buffer processing area provided within the recording medium such as the RAM 2214, hard disk drive 2224, DVD-ROM 2201, or IC card, transmits the read transmission data to the network, or writes reception data received from the network to a reception buffer processing area which is provided on the recording medium.

Further, the CPU 2212 may set all or necessary portions of files or database stored in an external recording medium such as the hard disk drive 2224, the DVD-ROM drive 2226 (DVD-ROM 2201), an IC card, or the like on the RAM 2214, and may perform various types of processing on the data on the RAM 2214. The CPU 2212 then writes back the processed data to the external recording medium.

Various types of information, such as various types of programs, data, tables, and databases, may be stored in the recording medium and processed. The CPU 2212 may perform various types of processing on data read from the RAM 2214 including various types of operations, information processing, conditional determination, conditional branching, unconditional branching, information search/replacement, etc., which are described throughout the present disclosure and designated by an instruction sequence of the program, and the results may be written back to the RAM 2214. Further, the CPU 2212 may search for information in a file, database, or the like in the recording medium. For example, in a case where a plurality of entries with attribute values for a first attribute associated with an attribute value of a second attribute are stored in the recording medium, the CPU 2212 searches an entry that matches with the condition among the plurality of entries, where the attribute value of the first attribute is specified, reads the attribute value of the second attribute stored in the entry, thereby acquires the attribute value of the second attribute associated with the first attribute that satisfies the predetermined condition may be obtained.

The program or software module described above may be stored on the computer 2200 or in a computer-readable medium near the computer 2200. Further, a recording medium such as a hard disk or RAM provided in a dedicated communication network or a server system connected to the Internet can be used as a computer-readable medium, thereby providing a program to the computer 2200 via a network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As is clear from the above description, according to the embodiment(s) of the present invention, a distance detector can be realized.

What is claimed is:
1. A distance detector, comprising:
a light projecting unit configured to project light toward a target body;

a light receiving unit configured to receive a reflected light from the target body;

a time detection unit configured to detect a light receiving time from the projecting of the light by the light projecting unit to the receiving of the reflected light by the light receiving unit, the time detection unit further including a setting unit configured to set a false detection range in which the light receiving time may be falsely detected;

a calculation unit configured to calculate a distance to the target body based on a detection result of the light receiving time by the time detection unit; and an evaluation unit configured to evaluate a reliability of a calculation result of the distance to the target body by the calculation unit based on (i) a deviation of a distance corresponding to the calculation result from a reference value regarding the distance to the target body and (ii) the false detection range.

2. The distance detector according to claim 1,
wherein, in a case where a plurality of calculation results of the distance to the target body are obtained by the calculation unit, the evaluation unit evaluates a reliability of each of the plurality of calculation results based on a deviation of a distance corresponding to each calculation result from the reference value regarding the distance to the target body, and selects a calculation result having a high reliability from among the plurality of calculation results based on an evaluation result.

3. The distance detector according to claim 2,
wherein the evaluation unit evaluates the reliability to be higher as the deviation from the reference value is smaller.

4. The distance detector according to claim 1,
wherein the light projecting unit projects light toward the target body multiple times, and
wherein the time detection unit periodically counts an occurrence of an event in which an intensity of a light receiving signal obtained by receiving the reflected light by the light receiving unit exceeds a threshold, from each projecting of the light by the light projecting unit at every time of projecting the light by the light projecting unit, integrates the count for the multiple times of projecting light, and detects the light receiving time based on an integration result.

5. The distance detector according to claim 4,
wherein, in a case where a peak of the count included in the integration result has a finite width, the time detection unit detects the light receiving time from a center position of the peak.

6. The distance detector according to claim 4,
wherein, in a case where a peak of the count included in the integration result has a finite width, the time detection unit detects the light receiving time from a maximum position of the peak.

7. The distance detector according to claim 1,
wherein, in a case where a distance indicated by the reference value overlaps with the false detection range, the evaluation unit evaluates the reliability of the calculation result of the distance to the target body included in the false detection range to be higher.

8. The distance detector according to claim 1,
wherein the reference value regarding the distance to the target body is acquired based on a current position and position information of the target body.

9. The distance detector according to claim 8, further comprising:
a position receiving unit configured to receive the current position.

10. The distance detector according to claim 8, further comprising:
an acquisition unit configured to acquire the position information.

11. The distance detector according to claim 1, further comprising:
a display unit configured to display the distance to the target body.

12. A display device for displaying a distance to the target body which is detected by the distance detector according to claim 1.

13. A distance detection method, comprising:
projecting light toward a target body;
receiving a reflected light from the target body;
detecting a light receiving time from the projecting of the light to the receiving of the reflected light;
setting a false detection range in which the light receiving time may be falsely detected;
calculating a distance to the target body based on a detection result of the light receiving time; and
evaluating a reliability of a calculation result of the distance to the target body based on (i) a deviation of a distance corresponding to the calculation result from a reference value regarding the distance to the target body and (ii) the false detection range.

14. The distance detection method according to claim 13,
wherein, in the evaluating, in a case where a plurality of calculation results of the distance to the target body are obtained in the calculating, a reliability of each of the plurality of calculation results is evaluated based on a deviation of a distance corresponding to each calculation result from the reference value regarding the distance to the target body, and a calculation result having a high reliability is selected from among the plurality of calculation results based on an evaluation result.

15. The distance detection method according to claim 14,
wherein, in the evaluating, the reliability is evaluated to be higher as the deviation from the reference value is smaller.

16. A non-transitory computer-readable medium having recorded thereon a program to cause a computer to execute:
causing light to be projected toward a target body;
causing reflected light to be received from the target body;
detecting a light receiving time from the projecting of the light to the receiving of the reflected light;
setting a false detection range in which the light receiving time may be falsely detected;
calculating a distance to the target body based on a detection result of the light receiving time; and
evaluating a reliability of a calculation result of the distance to the target body based on (i) a deviation of a distance corresponding to the calculation result from a reference value regarding the distance to the target body and (ii) the false detection range.

17. The non-transitory computer-readable medium according to claim 16,
wherein, in the evaluating, in a case where a plurality of calculation results of the distance to the target body are obtained in the calculating, a reliability of each of the plurality of calculation results is evaluated based on a deviation of a distance corresponding to each calculation result from the reference value regarding the distance to the target body, and a calculation result having a high reliability is selected from among the plurality of calculation results based on an evaluation result.

18. The non-transitory computer-readable medium according to claim 17,
   wherein, in the evaluating, the reliability is evaluated to be higher as the deviation from the reference value is smaller.

* * * * *